Aug. 26, 1958    L. E. AUSTIN ET AL    2,849,101
CONVEYOR DISPATCHING MACHINE
Filed March 2, 1955                              13 Sheets-Sheet 1
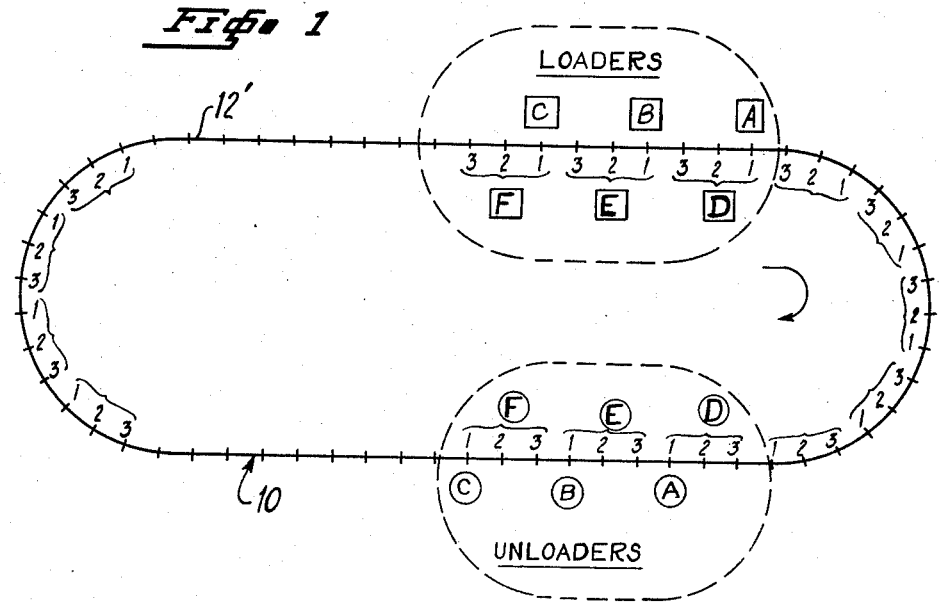
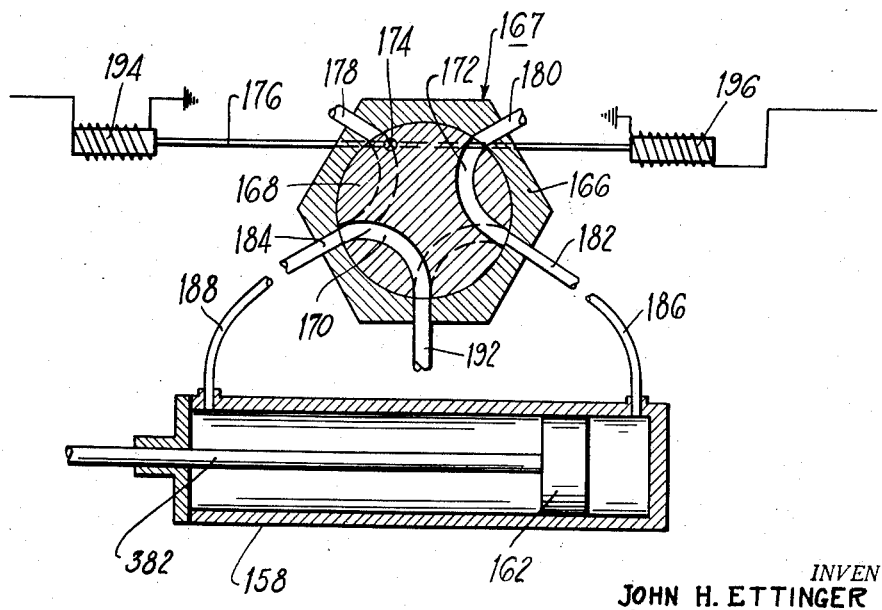
INVENTORS
JOHN H. ETTINGER
ARTHUR K. BROWN JR.
LEONARD E. AUSTIN
BY- H. O. Clayton
ATTORNEY

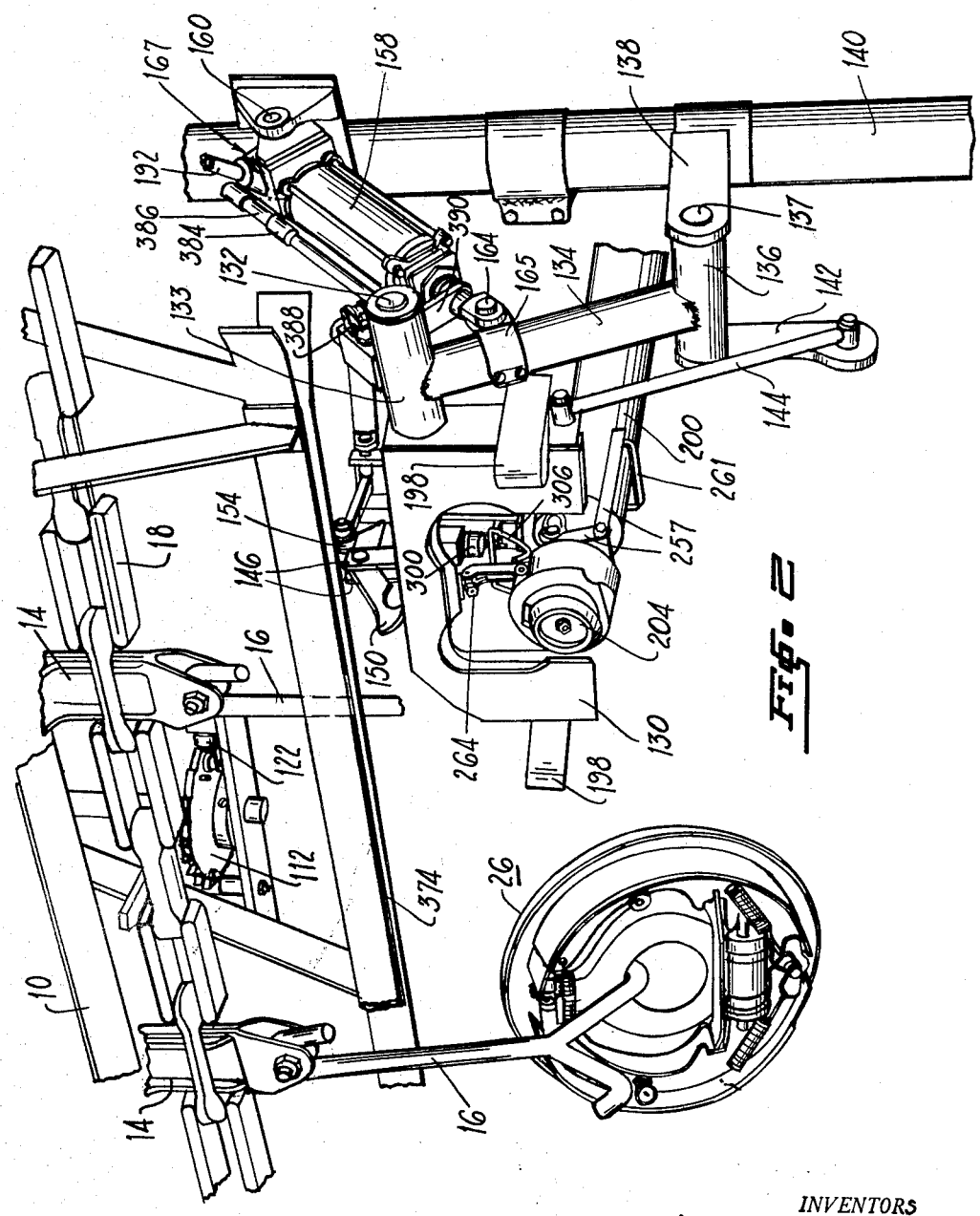

Aug. 26, 1958 L. E. AUSTIN ET AL 2,849,101
CONVEYOR DISPATCHING MACHINE
Filed March 2, 1955 13 Sheets-Sheet 3

INVENTORS
JOHN H. ETTINGER
ARTHUR K. BROWN JR.
LEONARD E. AUSTIN
BY- H.O.Clayton
ATTORNEY

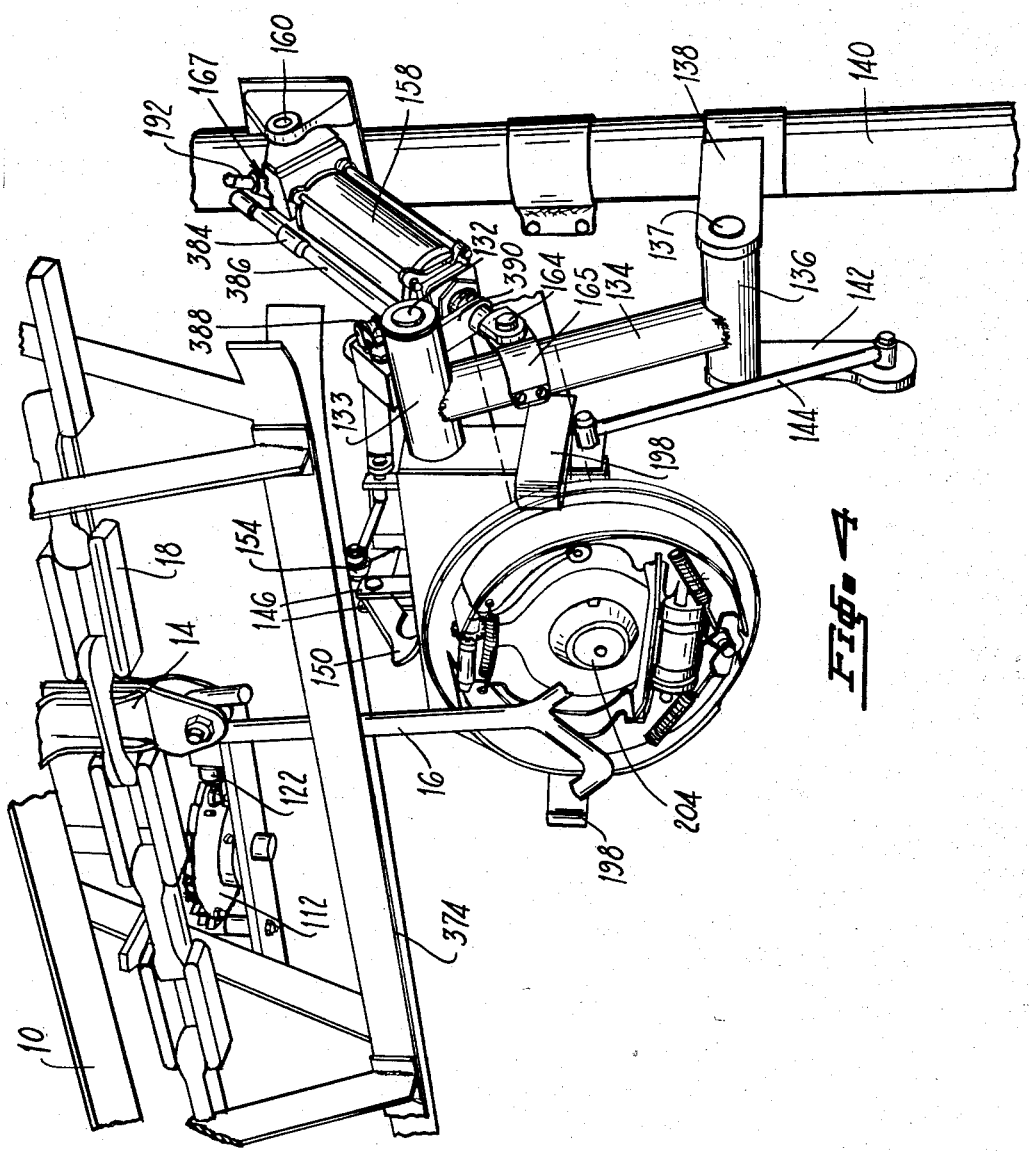

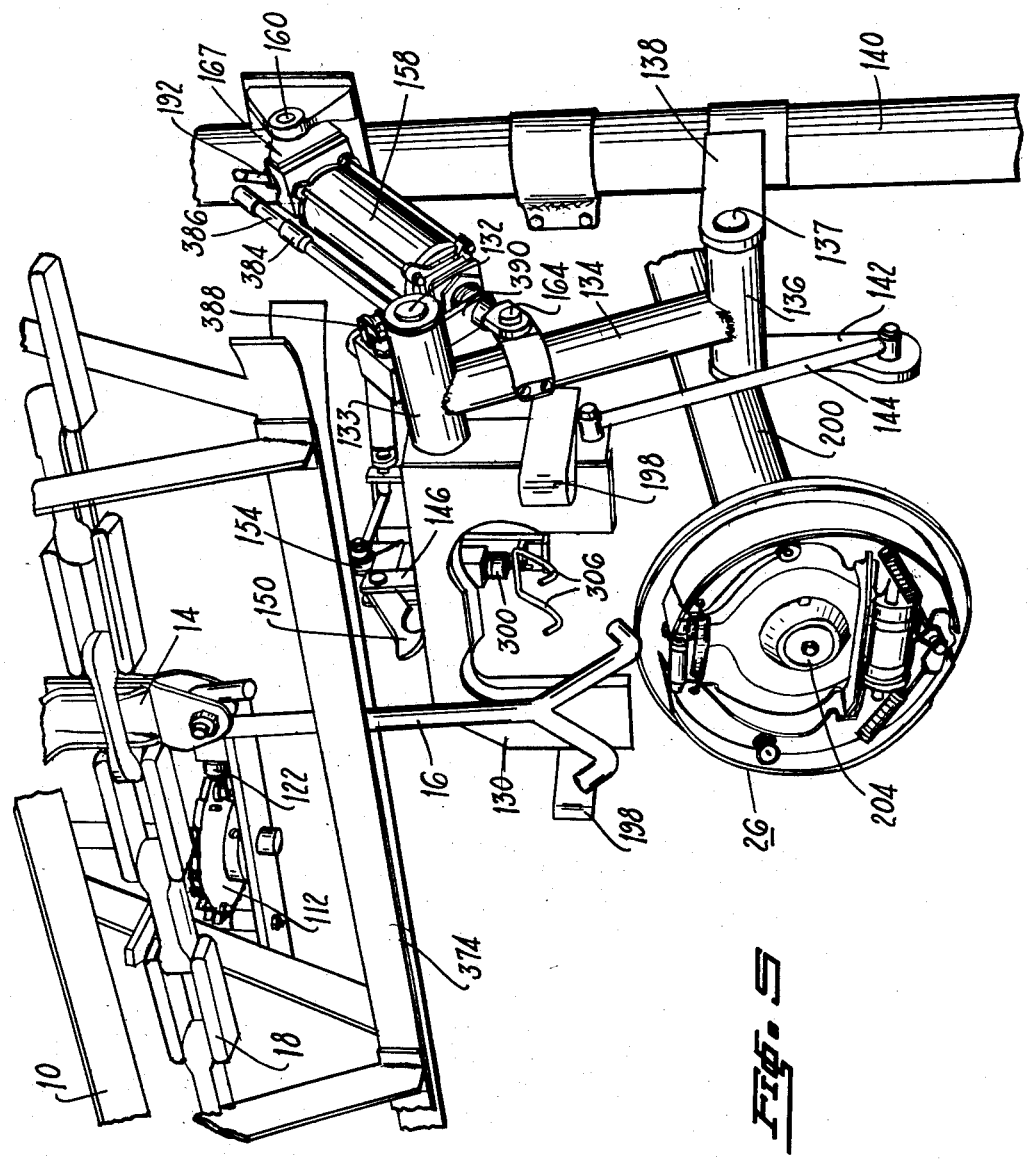

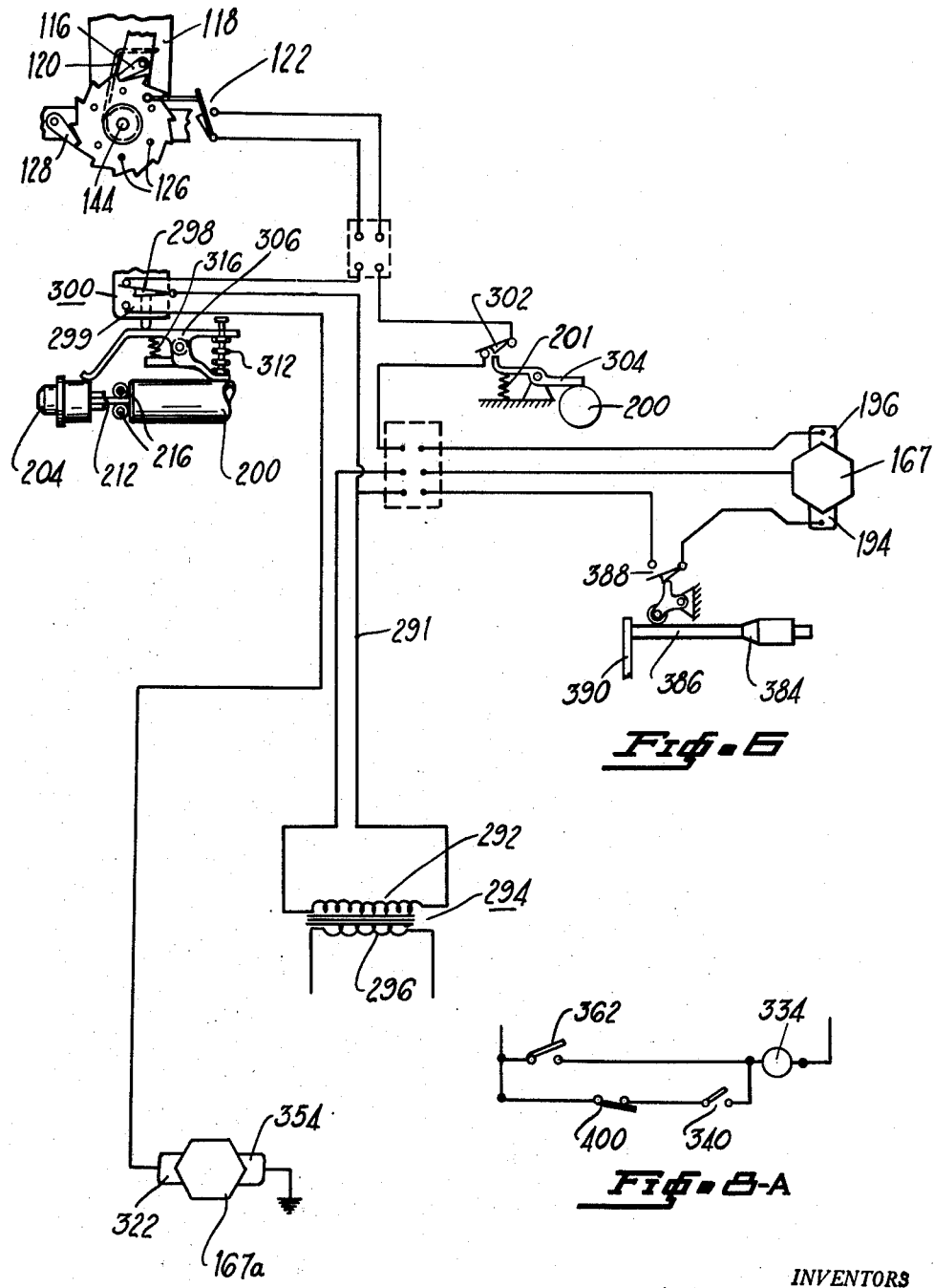

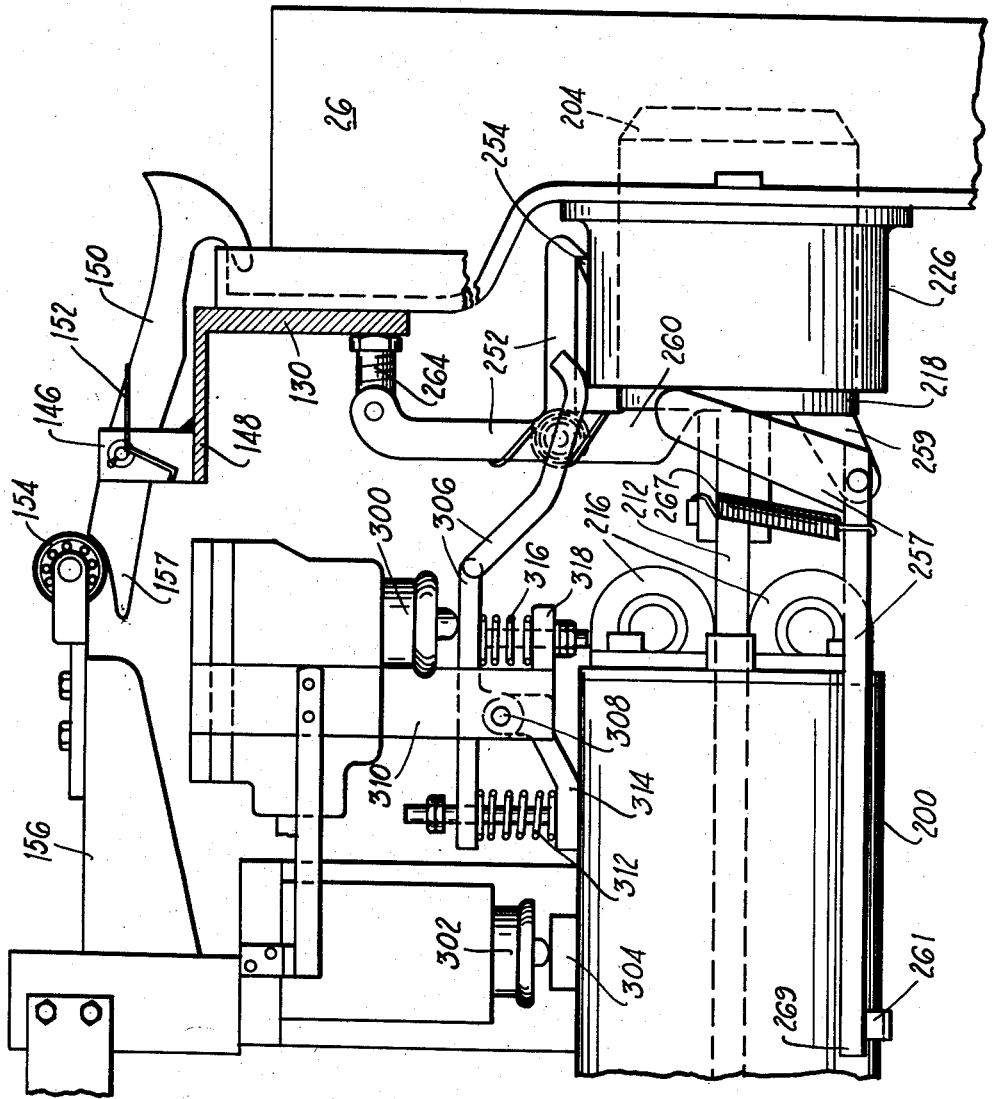

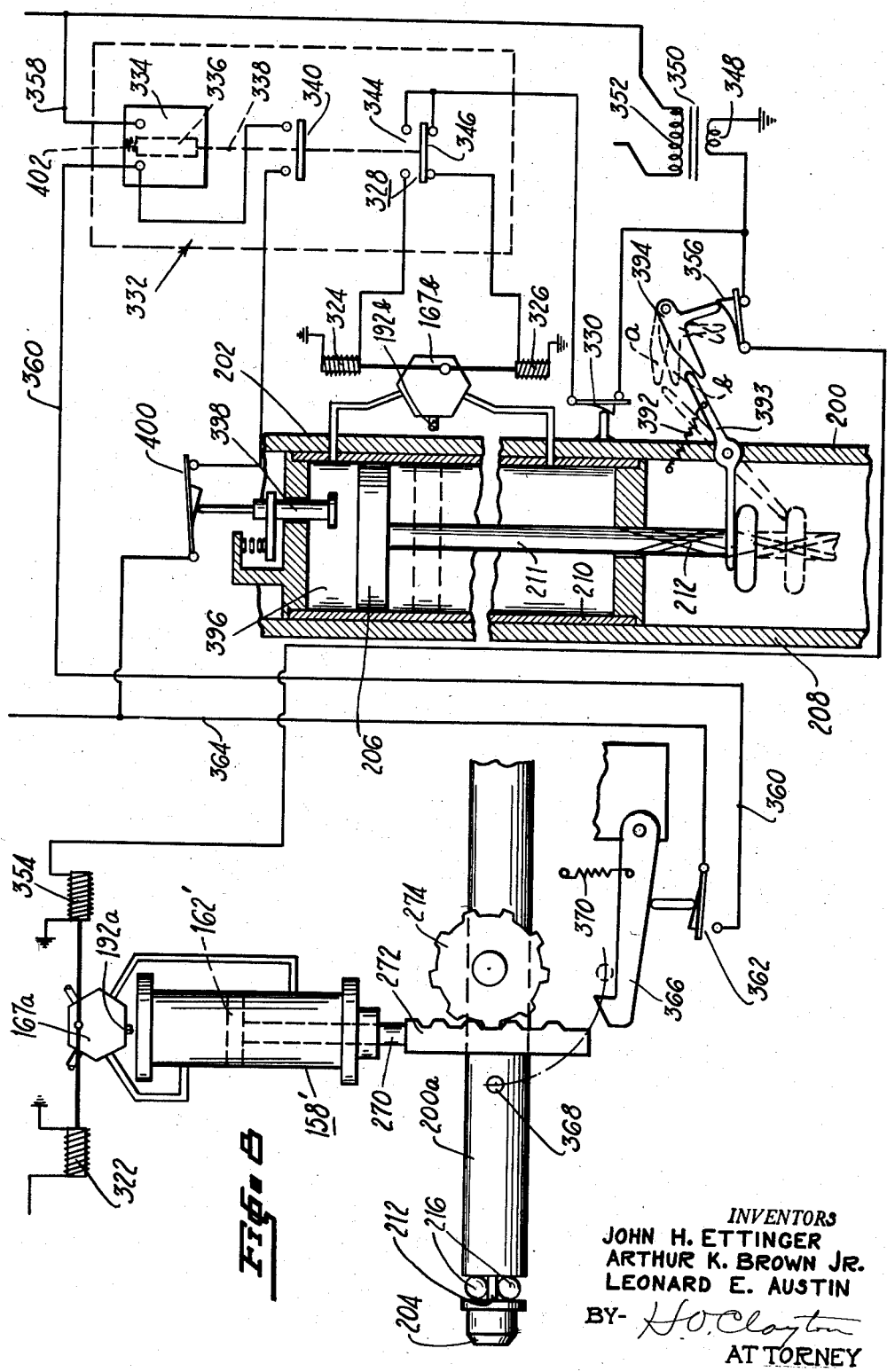

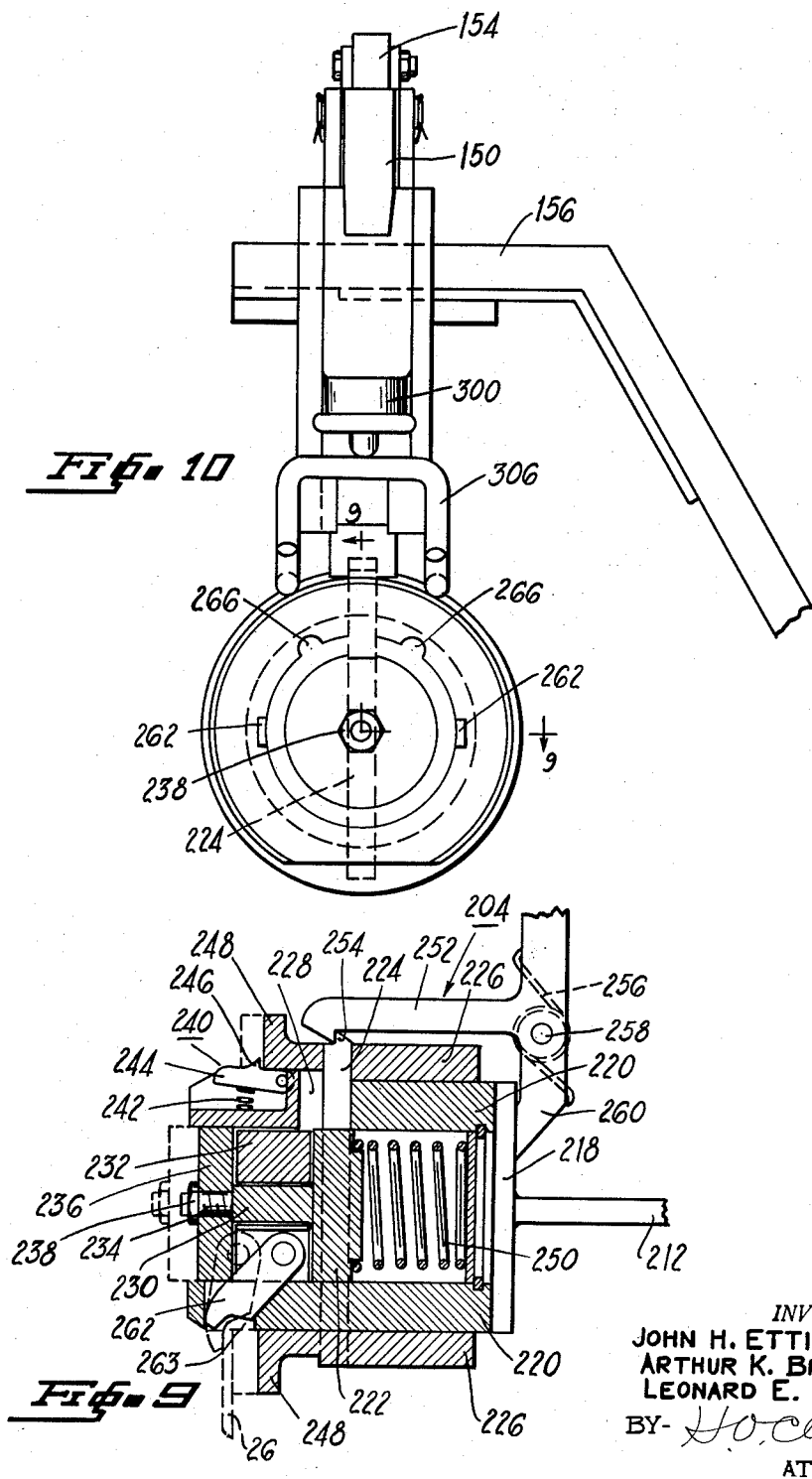

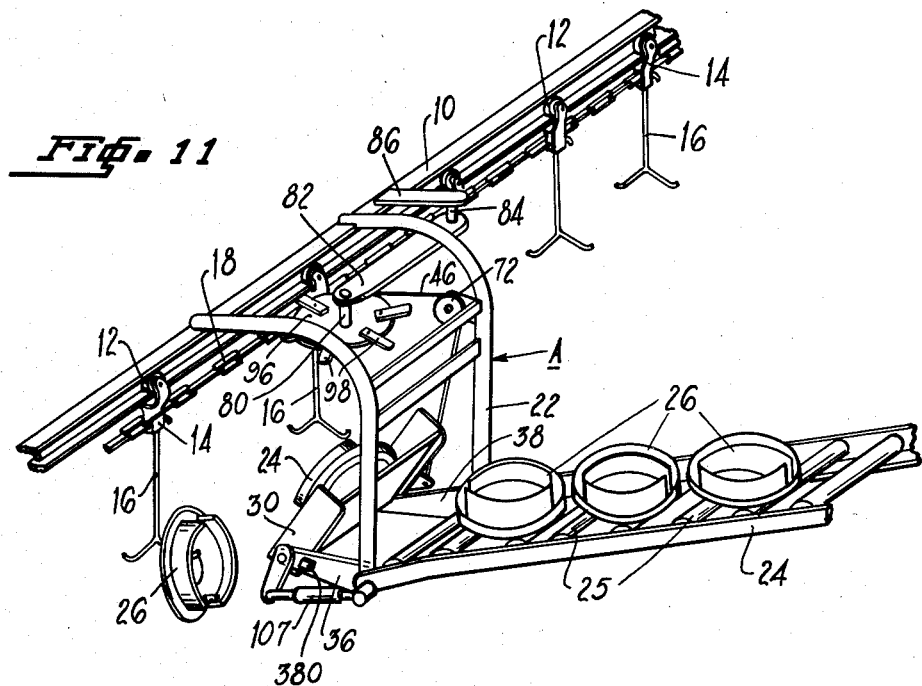
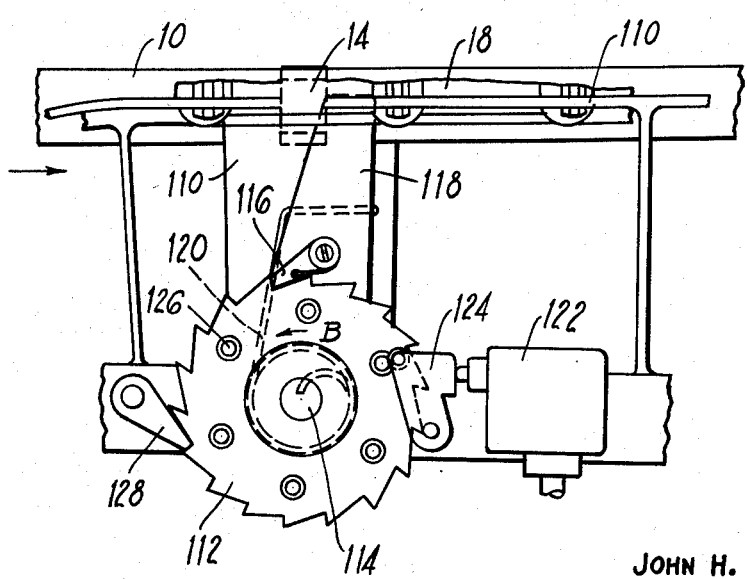

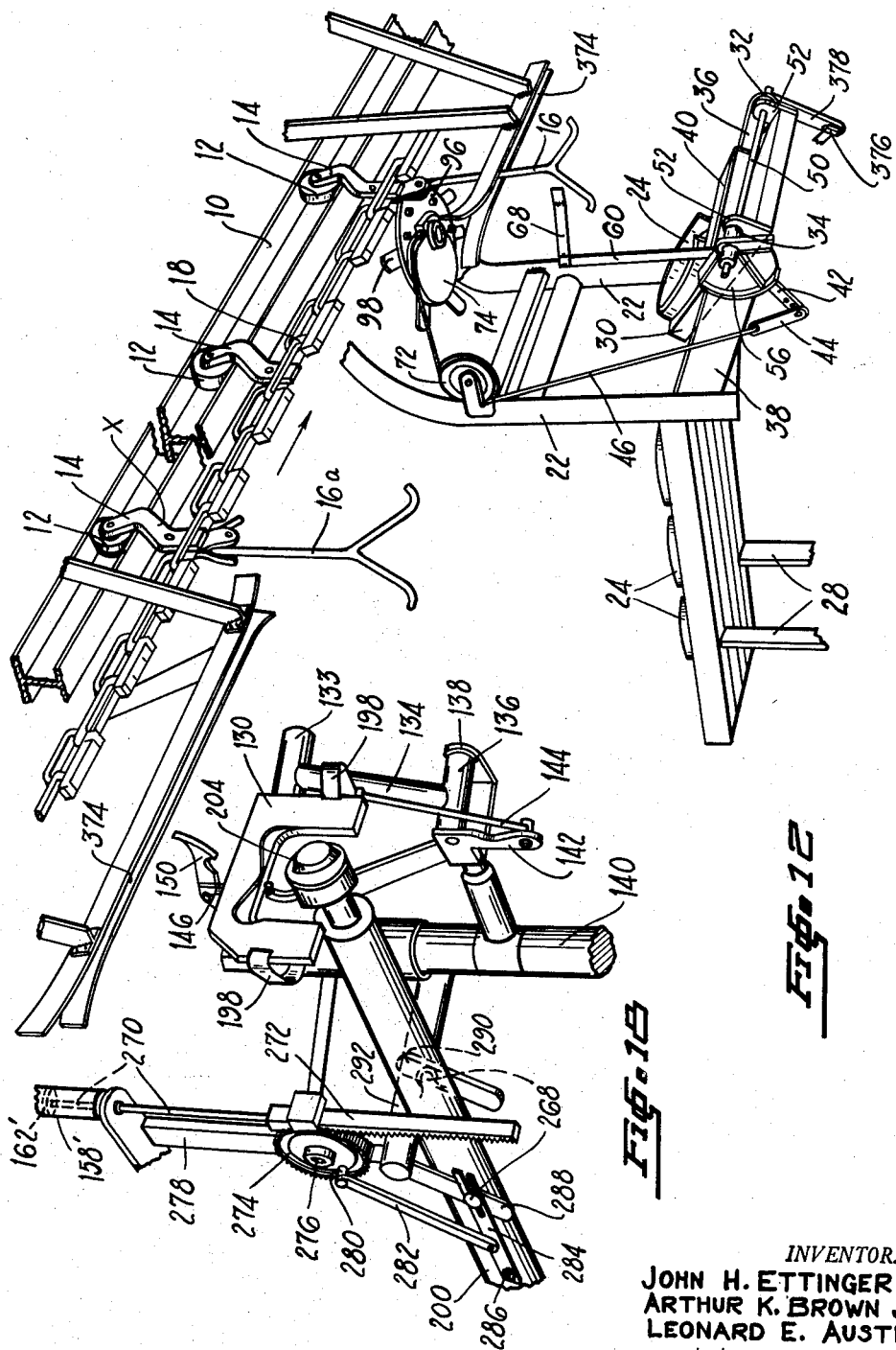

INVENTORS
JOHN H. ETTINGER
ARTHUR K. BROWN JR.
LEONARD E. AUSTIN
BY- H.O.Clayton
ATTORNEY Aug. 26, 1958   L. E. AUSTIN ET AL   2,849,101
CONVEYOR DISPATCHING MACHINE
Filed March 2, 1955   13 Sheets-Sheet 13

INVENTORS
JOHN H. ETTINGER
ARTHUR K. BROWN JR.
LEONARD E. AUSTIN
BY H. O. Clayton
ATTORNEY United States Patent Office 2,849,101
Patented Aug. 26, 1958

2,849,101

CONVEYOR DISPATCHING MACHINE

Leonard E. Austin, Arthur K. Brown, Jr., and John H. Ettinger, South Bend, Ind., assignors to Bendix Aviation Corporation, South Bend, Ind., a corporation of Delaware Application March 2, 1955, Serial No. 491,738

11 Claims. (Cl. 198—38)

This invention relates in general to means for selectively loading and unloading powered conveyors and in particular to a means of this type for transporting a plurality of different units, such as several types of automobile brakes, from one part of a manufacturing plant to another part of said plant, there to be disposed of as desired.

There is a need in this art for an automatically operated mechanism operable to load a conveyor with a plurality of types of products said products being then conveyed to unloader mechanism which selects and deposits the product at a desired station. The mechanism of our invention, hereinafter described in this specification, meets this need for with said mechanism a plurality of types of brakes or other units there being a plurality of units of each of said types, are selectively loaded on a conveyor, and then transported to another place there to be selectively unloaded and deposited at the desired stations.

Another object of our invention is to provide a plurality of loader mechanisms together with corresponding unloader mechanisms said mechanisms being cooperable with a single conveyor system, said system comprising an endless conveyor carrying a plurality of conveyor units.

Yet another object of our invention is to provide a mechanism for sequentially loading a plurality of different units upon a conveyor mechanism, said operation being effected in a certain area or areas of a manufacturing plant, then conveying said units to the same or other areas of said plant and there, in a certain sequence, unloading the units.

Our invention also contemplates the provision of a loader, conveyor, unloader mechanism including a conveyor mechanism comprising a number of conveyor units said number being a multiple of a certain number, said conveyor mechanism cooperating with one or more loader units and a corresponding number of unloader units.

Another object of our invention is to provide, in combination with a power driven conveyor mechanism having a plurality of chain driven trolley units, a relatively simple mechanism, driven by the conveyor mechanism, for loading a plurality of types of units onto said trolley units, together with a relatively simple power operated unloader mechanism for, in a desired sequence, removing said units from the trolley units.

A still further object of our invention is to improve the construction and operation of mechanisms of this character so that the parts thereof may be assembled and disassembled with ease, and to facilitate the removal of separate component parts or groups of parts of the mechanism without disturbing or interfering with the other elements of the mechanism.

An important object of the present invention is to so construct a mechanism for the present purposes as to make possible the attainment of all of the results hereinbefore specified, as well as other results which will appear from a study of the following specification.

An object of our invention is, generally speaking, to provide a mechanism of the aforementioned type which shall be automatic in its entire operation and require no duty on the part of the attendant beyond placing the work, such as an automobile brake or other unit, upon a suitable work carrier by which the work is fed into the mechanism; or if desired the work may be machine fed to the mechanism.

Another object of our invention is to provide a relatively simple automatically operable mechanism for accurately and expeditiously transporting a plurality of different units, such as a plurality of types of automobile brakes or a plurality of airplane parts, from one area of a manufacturing plant to another area of said plant and there deposit all units of each different type in a receptacle such as a carton or its equivalent there being, of course, a receptacle for each type of unit.

Yet another object of our invention is to provide a mechanism of the above mentioned character which is accurate and reliable in operation.

Yet another object of our invention is to provide a mechanism of the class referred to which is so constructed as to operate rapidly and efficiently with a minimum possibility of damage being done to the parts of the mechanism, and requiring a minimum of attention by the operator in charge.

A further object of our invention is to provide a loader, conveyor, unloader mechanism wherein a conveyor, including a certain number of trolley units, cooperates with a plurality of loaders and a plurality of unloaders each loader, or a plurality of said loaders, and each unloader, or a plurality of said unloaders, handling a different type of unit to be conveyed, the loaders and unloaders being so constructed and the number of trolley units, a multiple of a certain number, being such that the units are loaded onto the conveyor mechanism in a certain sequence there being a plurality of said sequences.

Other objects and advantages of the present invention will become apparent during the following description of one embodiment of our invention, reference being had therein to the accompanying drawings, in which:

Figure 1 is a view disclosing, in a diagrammatic manner, the principal features of our invention;

Figure 2 is a view disclosing, in perspective, the principal features of the unloader unit of our invention the brake to be unloaded being shown approaching a position opposite the brake receiving yoke;

Figure 4 is a view, similar to Figures 2 and 3, disclosing the brake unit mounted on the nose of the tube unit of our invention, the position it takes shortly after being dropped from the hook of the yoke mechanism;

Figure 5 is a view, similar to Figures 2, 3 and 4, disclosing the tube with the brake unit mounted on its end, the tube having moved downwardly somewhat toward its vertical position;

Figure 6 is a diagrammatic view disclosing most of the principal electrical controls of the unloader unit of our invention;

Figure 7 discloses, in general outline, the nose portion of the brake receiving tube of the unloader unit together with some of the electrical controls and a part of the yoke mechanism;

Figure 8 is a diagrammatic view disclosing, in section, the nose operating motor housed within the tube of our invention, together with the motor for rotating the tube, and controls for said motors;

Figure 8a is a view disclosing a part of the electrical hookup of the hold down relay of the mechanism of our invention;

Figure 9 is a sectional view, taken on the line 9—9 of

Figure 3:
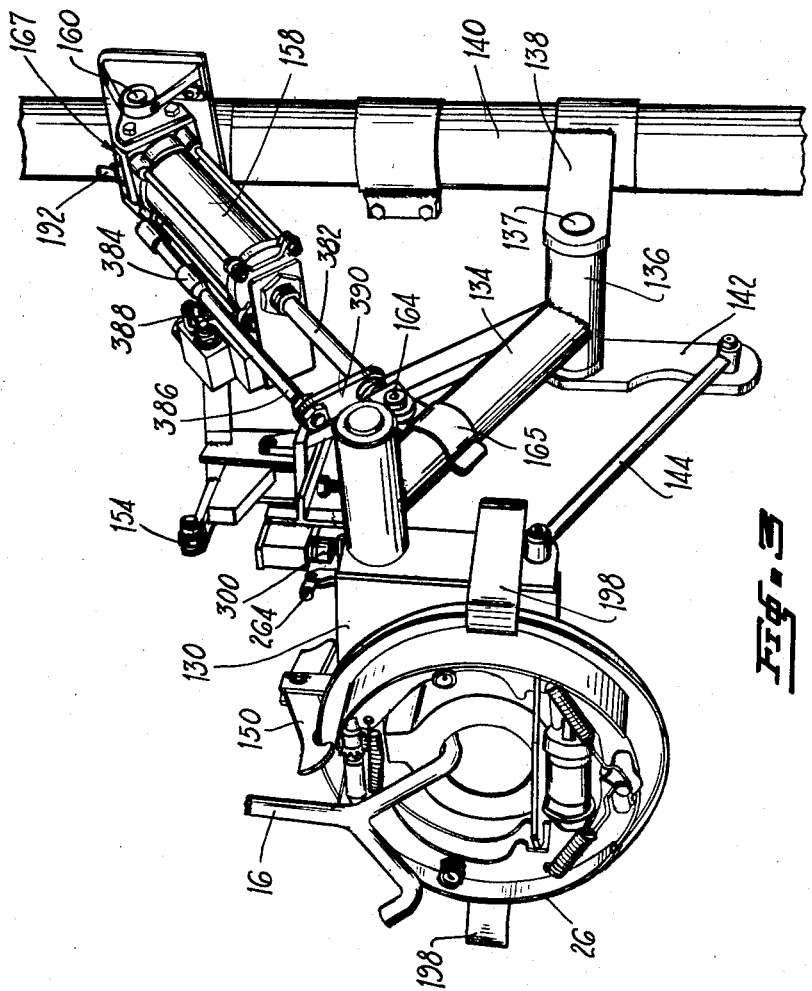
Figure 3 is a view, similar to Figure 2, disclosing the yoke of our mechanism in the act of picking up the brake unit being unloaded.
Figure 14:
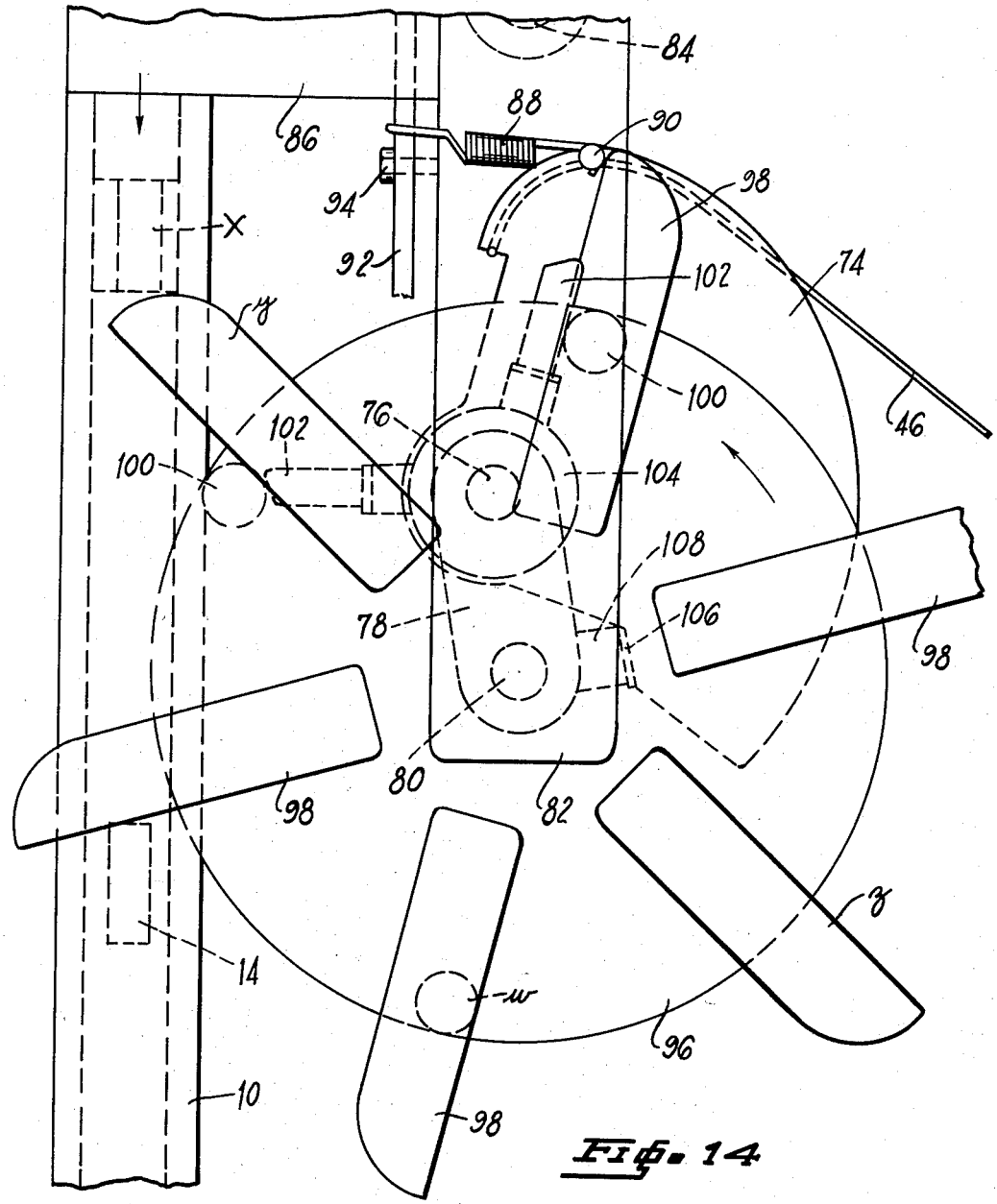
Figure 16:
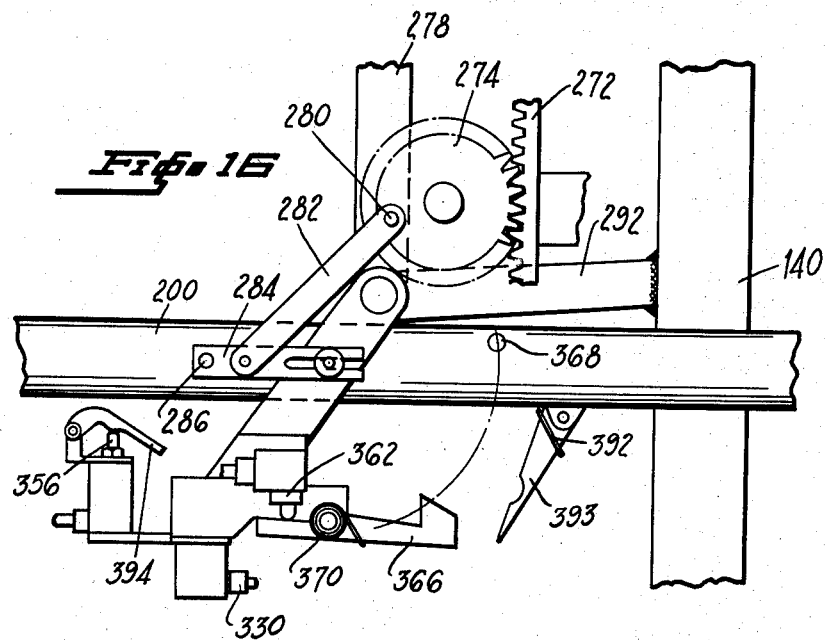
Figure 17:
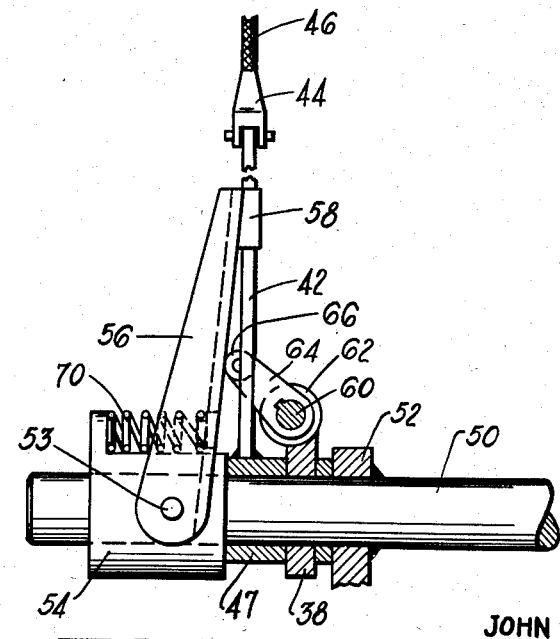

Figure 10, disclosing details of the nose unit of the brake holding tube of our invention;

Figure 10 is a view looking into the brake holding end, that is nose and, of the tube of our invention;

Figure 11 discloses, in perspective, the loader unit of our invention the tray of said unit having been angularly moved to a position where it is about to drop a brake unit onto a hook;

Figure 12 is another view, in perspective, disclosing details of the loader unit of our invention an empty hook being shown approaching said unit;

Figure 13 is a view disclosing details of the signal switch operating mechanism of the unloader unit of our invention;

Figure 14 discloses details of the starwheel mechanism of the loader unit;

Figure 15 is a sectional view disclosing details of the pressure differential operated motor of our invention, and the solenoid operated valve for controlling said motor;

Figure 16 discloses part of the mechanism for imparting an angular rotation of the tube of our invention; and this view also discloses three of the switch operating means of the controls of the unloader unit;

Figure 17 is a view disclosing details of the loader unit disabling clutch mechanism of our invention; and Figure 18 is a view disclosing details of the power mechanism for imparting an angular movement of the brake holding tube of our invention.

Referring now to the several figures of the drawings disclosing a preferred embodiment of our invention there is diagrammatically disclosed in Figure 1 a loader, unloader and conveyor mechanism. The conveyor system of this mechanism preferably includes an endless elliptically shaped I-beam track 10, Figures 11 and 12, which serves as a support for a plurality of equally or substantially equally spaced trolleys or conveyor units each comprising a roller 12 to which is pivotally secured a hanger 14 and further comprising a hook member 16 secured to the lower end of the hanger, each hook having two prongs lying in a plane which is perpendicular or substantially perpendicular to the plane of that portion of the I-beam upon which the trolley is mounted. One of the two prongs projects outwardly of the track 10 and the other of the prongs projects inwardly all as is disclosed in Figures 11 and 12. The trolley units are preferably moved around the track 10 by a power operated endless chain 18 the hanger 14 of each unit extending through said chain.

Referring again to the diagrammatic showing of Figure 1 the trolleys, for convenience, are indicated by the numeral 12'. This figure also diagrammatically discloses the loader and unloader mechanism of our invention the loaders being indicated by the capital letters A to F inclusive each enclosed by a square; and corresponding unloader units are indicated by capital letters A to F inclusive each enclosed by a circle.

Each of the letters in Figure 1 also indicates a particular type of piece part, that is work unit being processed such as a particular type of automobile brake or other unit such as a container of some sort; and each of the loaders and unloaders is positioned in Figure 1 opposite a certain numbered trolley indicating that the loader A, for example, will load a Ford brake on the first sequence of three trolleys passing this particular loader; and loader B will load, say, a Chevrolet brake on trolley number two, the second trolley of the bracketed one to three sequence of trolleys of Figure 1. However it is to be stressed here that the mechanism of our invention is not limited to the particular type of unit processed, that is loaded upon the conveyor as desired and then unloaded as desired. The endless conveyor of our invention may be located in a manufacturing plant or other building; or it may be located out of doors, there being no limitation as to the length of the conveyor, where it may be located, and what it may convey. In the embodiment of our invention disclosed in this application a plurality of types of automobile brakes are processed, the particular loading mechanism and unloading mechanism, constituting important features of our invention, being constructed and operative to load several types of automotive brakes upon a conveyor and then unload said brakes as desired. All of the loaders of the mechanism of Figure 1 are encircled by a dotted line as are the unloaders however said loaders and unloaders are not necessarily so grouped together for they may be intermixed; furthermore the loader mechanism of our invention may consist of only one loader unit.

Discussing now one of the most important features of our invention, to insure the desired efficiency and effectiveness of the mechanism, particularly the desired unloading of the units transported, the conveyor mechanism includes a certain number of trolley units said number being a multiple of a certain number; however the particular number of trolleys may if desired, be changed to correspond with a relatively slight change in the construction of the loader and unloaders, all of which will be brought out in the description to follow. Explaining the fact that the number of trolleys is a multiple of a certain number, if there are say three types of automobile brakes to be conveyed on the outwardly extending prongs of the hook 16 then the total number of trolley units its a multiple of the number three; and if, as diagrammatically disclosed in Figure 1, the inwardly extending prongs are also employed to transport three more types of brakes, then the number of trolley units remains a multiple of three.

Another important feature of our invention lies in the construction and operation of the mechanism of Figure 1 whereby the types of units to be loaded on the conveyor may be loaded in a certain sequence; however as will be noted hereinafter with the mechanism of this figure any one of a plurality of sequences may be chosen. Thus with the embodiment of our invention disclosed in Figure 1 and confining our discussion to the loaders and unloaders located opposite the outside hooks of the conveyor, where three types of brake units are loaded, the loaded sequence may be A, B, C; B, C, A; or C, A, B, that is a certain sequence; or the sequence may be any one of B, A, C; A, C, B; or C, B, A; and the construction and arrangement of the units of the mechanism is such that the unloading mechanism, the unloader units of which correspond to the loader units of the loading mechanism, may be adjusted to unload the products in the same sequence as said products are loaded, that is A, B, C. As with the loader mechanism it may however be unloaded in the sequence B, A, C. Thus, as is disclosed in Figure 1, the circled unloaders A, B and C may unload the brakes in the same sequence that the squared loader units A, B and C load the brakes. The sequence number may, as will be apparent from the description to follow, be some other number than 3, say 4 or 6; or the three sequence of Figure 1 may itself be changed as indicated above. It is to be particularly noted that in order to effect the desired unloading operation it is necessary that the loaders and unloaders of our invention operate in a certain sequence and that the number of trolleys be a multiple of said sequence number; and the number of types of work units which can be handled is also a multiple of the product of the sequence number times two if loaders and unloaders are placed both inside and outside the conveyor; that is opposite both prongs of the hooks.

Describing now one of the loader mechanisms of our invention, say loader A, Figure 1, two spaced apart steel tubes 22, curved in shape as disclosed in Figures 11 and 12, are secured at their upper ends to the track 10; and to their lower ends there is secured the lower end of an inclined track unit 24 having rollers 25 supporting brake units 26 of one type, say a Ford brake. As is disclosed in Figure 12 the inclined track 24 is supported adjacent its upper end by a support 28 there being two of said supports. The Ford brake units are placed on the track by an attendant or automatic means whereupon they are fed by gravity to a tray 30 pivotally mounted at 32 and 34 upon spaced apart inclined supports 36 and 38 respectively. These supports are fixedly secured at their upper ends to the tubes 22. As is made apparent from an inspection of Figures 11 and 12 the lowermost Ford brake unit is escaped from the track 24 onto the tray 30; and shortly thereafter said tray is angularly rotated upwardly toward the hook 16 the weight of the brake unit then, in large measure, being taken by an angular shaped support member 40, Figure 12, secured to the base of the tray.

The tray 30 with its brake unit is angularly rotated upwardly by means of a crank 42, Figures 17 and 12, to which is adjustably and pivotally secured a strap 44. To this strap there is secured a cable 46 and actuating means therefor described hereinafter. The crank 42 is provided at one of its ends with a hub portion 47, Figure 17, rotatably sleeved over a rod 50. This rod extends through a hub 54 and is fixedly secured to hub 54 by pin 53. This rod 50 is also fixedly received to brackets 52 extending upwardly from the base of the tray 30 at its lower corners. One end of the rod 50 is pivotally mounted in the lower end of the support member 36 and the other end of said rod extends through and is rotatably mounted in the lower end of the support member 38. As is disclosed in Figure 17 the pin 53 extends through an arm 56, said arm being positioned alongside the crank 42. This arm is pivotally mounted on the pin 53 and is provided with a flange 58 overlying the crank 42; and it is to be remembered that this crank is rotatably mounted on the rod 50. It will now be apparent that with the arm 56, positioned as disclosed in Figure 17 that is with the flange 58 overlying the crank 42, will, with upward rotation of said crank, Figure 12, serve to rotate the rod 50 about its axis; and this results in the upward angular movement of the tray 30.

The arm and its flange 58 may, however, be angularly moved away from the crank 42 thereby rendering the crank 42 ineffective to actuate the tray; and this is effected by means of a rod 60 journalled at its lower end in a bearing 62 which is secured to the support 38 or otherwise fixedly secured in place. To the rod 60 there is keyed a crank 64 having a roller 66 on its outer end said roller bearing against the face of the arm 56. To the upper end of the rod 60, Fig. 12, there is secured a flange 68 positioned in the path of a brake unit, not shown, mounted on the outwardly extending prong of the hook 16. Should the approaching hook be loaded with a brake unit on its outwardly extending prong then this unit will strike the flange 68 thereby rotating the shaft 60; and this operation results in a counterclockwise rotation of the crank 64, Figure 17, to move the flange 58 out of the plane of the crank 42. In this operation the arm 56 is rotated counterclockwise against the pressure of a return spring 70 interposed between a flange 72 on the hub 54 and the body of said arm.

The cable 46, secured at one of its ends to one end of the strap 44, passes over a sleeve 72 mounted on one of the tubes 22; and said cable is secured at its other end, Figure 14, to a cam member 74. This cam member, shaped substantially as a quarter section of a disk, is pivotally mounted on a pin 76 which is fixedly secured to a generally rectangular shaped plate or strap 78. This strap is fixedly secured to a pin 80 which extends downwardly from one end of a rectangularly shaped support plate 82. This plate, which parallels the track 10, is pivotally mounted upon a pin 84 which is secured to the track by a strap 86. A spring 88, secured at one of its ends to a pin 90 extending from the plate 82 and at its other end to a support plate 92, serves to bias the plate 82 toward the track 10 and into abutment with an adjustable stop 94 secured to the plate 92.

A so-called star wheel or disk member 96 is rotatably sleeved over the pin 80 and lies between the support plate 82 and the cam 74. To the periphery of this star wheel there are secured equidistantly spaced fingers 98; and as disclosed in Figure 14 the outer cam shaped end of the fingers lies in the path of the movable hanger member 14 of the trolley unit. One or more pins 100 are secured to the lower side of the star wheel said pins, with a rotation of said wheel, moving into contact with a pin 102 adjustably mounted on a boss 104 secured to the cam 74. Continued rotation of the star wheel will then serve to rotate the cam 74 to actuate the tray 30. The pin 100 finally leaves the pin 102 as indicated in dotted lines to the left in Figure 14. It is to be noted that pin 100 moves about the pin 80 as a center of rotation and that the pin 102 moves about the pin 76 as a center of rotation. It is to be noted, from an inspection of Figures 11 and 12, that the cam 74, star wheel 96 and parts connected thereto including the strap 78 and support plate 82, lie as a unit opposite the track 10 and immediately above the tray 30. This unit may, by virtue of the part it plays in the operation of the loader, be defined as a counter mechanism.

As indicated above an important feature of our invention lies in the construction of the aforementioned cam and star wheel unit to provide means, cooperating with the tray 30 and cable 46, for loading a certain one of a sequence of hooks as the latter pass by the loader unit. In the embodiment of our invention disclosed in the several figures of the drawing the particular sequence number selected is three to thereby effect the loading and unloading of three different types of brakes on each side of the conveyor, say a Ford front brake, a Chevrolet front brake and a Chrysler front brake on one side of the conveyor and corresponding rear brakes on the opposite side of the conveyor. It follows therefore that a sequence of three being selected, there are, necessarily, three fingers 98 on the star wheel; or a multiple of three; and there is a pin 100 for every three fingers. With the particular mechanism disclosed in Figure 14 there are six fingers on the star wheel accordingly there are two pins 100 on said wheel.

As noted above it has been assumed that the loader mechanism described above is the loader indicated by the letter A in Figure 1 and it will further be assumed that said loader handles number one brake of the sequence, that is the Ford front brake; accordingly when number one trolley of the sequence of trolleys, that is trolley X of Figure 14, strikes finger Y of this figure then the star wheel is rotated counterclockwise in the direction of the arrow to bring a pin 100 into contact with the pin 102 to rotate the cam 74 counterclockwise and thereby operate the tray 30 to effect its brake loading operation. In this operation the brake is moved into the path of the approaching hook which then removes the brake from the tray.

Continued movement of the chain driven trolleys results in the next two trolleys, in succession, striking their corresponding fingers on the star wheel; and when the next of the number one trolleys strikes a finger, indicated as the finger Z for the purpose of this description, then a pin W, that is one of the aforementioned pins 100, serves to contact the pin 102 to again operate the then loaded tray to effect another loading operation. After each loading operation the weight of the tray and parts connected thereto will return the cam 74 to the position disclosed in Figure 14, a flange 106 on the cam moving into abutment with a stop 108 secured to the strap 78; and a dash pot 107, Figure 11, serves to cushion this operation. If the star wheel should fail to rotate thereby jamming the mechanism, the entire star wheel 96, cam 74, and support plate 82 will, by virtue of the yielding of the spring 88, rotate counterclockwise as a unit about the pin 84. This latter operation may result in the operation of a mechanism, not shown, for stopping the conveyor until the defect is remedied. It is also to be noted, as indicated above, that three of the fingers 98 and one of the pins 100 of the 6 finger 2 pin star wheels of Figure 14 may be omitted with a corresponding reduction in the diameter of the star wheel and the size of the cam and cooperating parts; and such a unit will cooperate just as well with the particular conveying mechanism of Figures 1, 11 and 12 to load the Ford front brakes on the number one trolley of said sequence.

There is thus provided, in the described loader unit A, Figure 1, a loader mechanism for loading a Ford front brake onto the outside hook of number one trolley of the sequence made up of three trolleys. The mechanism of loader B of Figure 1 preferably duplicates in construction the above described loader A and the arrangement of the parts is such that number two trolley, Figure 1, the outside hook prong of which is to receive the Chevrolet front brake, will serve to operate loader B to load this brake on said prong; and likewise the spacing, construction and arrangement of the parts is such that number three trolley, the outside hook prong of which is to receive the Chrysler front brake, serves to operate loader C to load the latter brake on the latter prong. Loaders D, E, and F, serving the inside prongs of the trolley hooks, also operate in the sequence as described above; and these loaders will handle three other types of brake units; and it is to be remembered that if the unloader mechanism about to be described fails to unload its brake then the mechanism of Figures 17 and 12 operates to momentarily disable the loader mechanism. The provision of a mechanism for loading the trolleys in a desired sequence facilitates the setting up of the unloading mechanism; for as the conveyor moves the workpiece, in this case the different brake units, toward the unloaders the order of their approach is fixed.

Describing now unloader unit A which description will suffice for all of the unloader units A to F inclusive, this unit is disclosed in part in Figures 2, 3, 4, 5, 7, and 13 of the drawings. Referring to Figure 13, disclosing one of the principal controls of this unloader unit, a frame structure 110, secured to the I-beam track member 10, supports a pawl and ratchet switch operating mechanism lying inside the confines of said track said mechanism including a ratchet 112 pivotally mounted upon a pin 114 secured to a portion of said frame structure. A ratchet operating pawl 116 of the mechanism is pivotally mounted on a crank 118 which is also pivotally mounted on the pin 114; and said crank extends outwardly toward the track the end portion of the crank lying in the path of the hanger 14 of the trollley unit. A pawl operating spring 120, wound around a portion of the ratchet, is secured at one of its ends to the crank and at its other end to the pin 144. A normallly open switch 122, no claim to which is made, is mounted on a portion of the frame structure 110; and this switch is closed by a lever 124 pivotally mounted on the frame. As will be described hereinafter the switch 122, when closed, initiates the cycle of operations of unloader A, Figure 1, to unload the Ford front brakes which were placed upon the conveyor by the above described loader A. Continuing the description of the ratchet mechanism the switch operating lever 124 is actuated by pins 126 secured to and extending downwardly from the bottom of the ratchet 112 there being one pin for every third tooth of the ratchet. Thus the switch 122 is closed every third time the ratchet is operated.

Describing now the operation of the switch operating pawl and ratchet mechanism, assuming the trolleys are moving in the direction of the arrows of Figures 1 and 13, then when a trolley contacts the crank 118 the latter is rotated in the direction of an arrow A, Figure 13, thereby winding up the spring 120. Then when the trolley leaves the crank the ratchet, by the operation of the pawl 116, rotates in the direction of an arrow B thereby closing the switch 122 with every contact of a pin 126 with the lever 124. A pawl 128 serves to hold the ratchet in place when the crank 118 is being actuated by the trolley. It is to be particularly noted that with the embodiment of our invention disclosed in the drawings the switch 122 of Figure 13 is closed only by the number one trolley, that is the first of the three trolleys going to make up the aforementioned sequence. It follows therefore that the number of teeth on the ratchet 112 of Ford front brake unloader A, that is the unloader now being described, must be either three or a multiple thereof; and it also follows that there is one pin 126 on said ratchet for every three ratchet teeth. There is thus provided, by the switch operating trolley operated ratchet 112 and cooperating parts, that part of the unloader mechanism which initiates the operation of said mechanism; accordingly the pawl and ratchet and crank unit may, together with the switch 122 be termed a signalling or counter mechanism of said unloader mechanism.

Describing now the remainder of the unloader mechanism A, the closing of the so-called signaling switch 122 initiates the operation of the mechanism for immediately removing the Ford front brake from the conveyor and depositing said brake in the desired location. This mechanism, the remaining electrical controls of which will be described hereinafter, includes a brake holding yoke mechanism 130, Figures 2 to 5 inclusive and Figure 7, having a cylindrically shaped pin 132 extending from one side thereof; and said pin is supported by sleeve 133 pivotally mounted thereon. This sleeve is fixedly secured to an arm 134 which is fixedly secured to a sleeve 136; and this sleeve 136 is rotatably mounted on a pin 137 which is fixedly mounted on a U-shaped support 138. The bracket 138 is secured to an upright 140 constituting part of the supporting frame structure of the unloader mechanism.

A hanger member 142, fixedly secured to the support 138 at its upper end, is pivotally secured, at its lower end, to a rod 144 which is pivotally secured, at its upper end, to the base of the yoke 130. The rod 144 and arm 134 serve to maintain the yoke in a vertical plane when the same is moved downwardly. As disclosed in Figures 2 and 7 spaced apart posts 146 are permanently secured to a top portion 148, Figure 7, of the yoke; and a hook member 150 biased downwardly by a spring 152, is pivotally mounted between said posts. As is disclosed in Figures 2 and 7, particularly the latter, a roller 154, mounted on supporting structure 156, strikes a cam shaped end portion 157 of the hook to rotate the same counterclockwise against the action of the spring 152 when the yoke is moved upwardly to its uppermost position.

As to the means for actuating the brake holding yoke said means include a double acting pressure differential operated motor 158, Figures 2 and 15, pivotally mounted at one of its ends at 160 to the upright 140. The power element 162, Figure 15, of said yoke operating motor is pivotally connected at 164 to strap 165 secured to the arm 134.

The valve mechanism for controlling the motor 158, and solenoids for operating said valve mechanism, is disclosed in Figure 15 and includes a casing 166 rotatably housing a disk shaped valve member 168. The valve as a whole is indicated by the numeral 167. No claim is made to this valve mechanism. The valve member 168 includes semicircular shaped ducts 170 and 172; and said member is actuated by a pin 174 which is connected with a solenoid operated rod 176. The pin 174 extends through a slot in the casing 166. The casing is ported to the atmosphere at 178 and 180 and provided with ducts 182 and 184 connected, respectively, to conduits 186 and 188 connected with the motor 158; and a duct 190 in the casing 166 is connected with a conduit 192 which is preferably connected with any suitable source of air pressure. Describing the operation of the mechanism of Figure 15 energization of a solenoid 194 moves the valve member 163 to the position disclosed in said figure to vent one end of the motor 158 and connect the other end to the source of air pressure; and this operation serves to energize said motor to move the piston 162 in one direction. Energization of a solenoid 196 serves to operate the valve to energize the motor to move the piston in the opposite direction.

Describing the operation of the yoke 130 when the motor 158 is energized the yoke is moved downwardly from its uppermost position disclosed in Figure 2. The brake 26 is at this time approaching a position immediately in front of the yoke the parts of the mechanism being so positioned and so operative that the signaling switch 122 is closed, to effect the energization of the motor 158, just before the brake is opposite the yoke. As stated above the electrical controls of the unloader mechanism, including the aforementioned solenoids for operating the valve 168, will be described hereinafter. As disclosed in Figure 5, when the brake and yoke are in juxtaposition, that is when the brake has been moved to a position immediately in front of the downwardly moved yoke, the hook 150 slips over the edge of the backing plate of the brake to secure the brake to the yoke. As disclosed in Figure 3 the yoke with its brake are then moved upwardly as a unit by a reverse operation of the motor 158; and when the hook 150 strikes the roller 154 the hook is rotated thereby releasing the brake. Guide members 198 secured to the sides of the yoke, serve, together with the hook, to position the brake as the same is lifted upwardly.

Continuing the description of the Ford brake unloader mechanism A a hollow tube member 200, including within its confines a relatively large double acting pressure differential operated motor 202, Figure 8, and a latch controlled motor operated two part brake supporting nose member 204, Figure 8, secured to the power element 206 of said motor, is operative first to take charge of the brake after it leaves the yoke and then deposit the same elsewhere; all as described hereinafter in this specification. The tube 200 also includes a cylindrical casing 208, Figure 8, housing a relatively long sleeve 210 which constitutes the principal body member of the aforementioned double acting motor 202. Disk shaped members, mounted in the ends of the sleeve, complete the body of the motor; and to the power element 206 of the motor, through the medium of a rod 211, there is secured a twisted substantially helically shaped ribbon like rod 212 preferably rectangular shaped in cross section. The rod 211 is preferably rotatably secured to the piston 206 and said rod is fixedly secured to the rod 212. The rod 212 extends between guide rollers 216 fixed in place at the end of the tube 200; and said rod is fixedly secured, at its outer end, to a plate 218, Figure 9, constituting one end of the two part brake supporting mechanism or nose member 204. The plate 218 is secured to one end of a cylindrically shaped body member 220 which, at about its center, is sleeved over a disk member 222 which is provided with an opening to receive a pin 224. This pin is preferably rectangular in cross section and extends through the member 220 and into an opening in a sleeve member 226 sleeved over the member 220. The sleeve member 220 is provided with a slot 228 to receive the pin 224 thereby providing means for moving the members 222 and 226 as a unit with respect to the member 220.

To the center of the disk 222 there is secured a pin 230 which extends through a cylindrically shaped member 232 which is slightly smaller than its housing; and to this pin there is secured a threaded stem 234 which extends through a washer member 236, a nut 238 serving to clamp the washer 236 and members 230 and 222 together as a unit. This unit and the member 220 constitute the two principal parts of the aforementioned two part brake supporting nose member 204. The members 220 and 226 are recessed to receive a latch unit 240; and a spring 242 of said unit serves to bias a latch member 244 of the unit upwardly to a position where a flange portion 246 on the latch member is in contact with the front face of a flange 248 at the end of the member 226. A spring 250, which is compressed in the position of the parts disclosed in Figure 9, serves to bias the disk member 222 and the members 226, 232 and 236 connected thereto to the left with respect to the body member 220. The parts of the brake supporting nose member 204 are held in this spring compressed or spring cocked position of Figure 9 by a bell crank shaped latch member 252 having a hooked end portion which fits over a projection 254 extending from the upper end of the pin 224. The latch member 252 is biased downwardly, that is into its latched position disclosed in Figure 9, by a spring 256; and the member 252 is pivotally mounted at 258 on a flange 260 which is fixedly secured to the member 218.

Completing the description of the latch mechanism of Figure 9 finger members 262, Figures 9 and 10, are pivotally mounted in a recess in the member 232 and extend into a slot 263 in the member 220; and when the members 232 and 226 are moved as a unit to the left with respect to the member 220, these finger members are rotated counterclockwise to the dotted line position disclosed in Figure 9. The ends of the fingers then project outwardly to hold the brake unit in place on the nose unit 204; all as is disclosed in dotted lines in Figure 9. Explaining the operation of the latch mechanism more completely the latch member 252 is moved counterclockwise, Figure 7, when an adjustable upper end portion 264 thereof is contacted by the back of the yoke 130; and this operation is effective just before the yoke reaches the end of its stroke in reaching its uppermost position.

Now when the latch 252 is released the spring 250 expands to move the flange 248 of member 226 into engagement with the latch 240. The parts are so positioned and constructed that the brake is released from the hook 150 immediately thereafter by the interaction of roller 154 and cam shaped surface 157; and the brake, now positioned over the nose 204, falls onto latch 240 releasing flange 248. Spring 250 then causes sleeve 226 and attached members to move outwardly as a unit projecting the fingers 262 and clamping the backing plate of the brake between the fingers and flange 248. If desired two spaced apart raised portions 266, Figure 10, on the end of the member 220 serve to center the brake on the end of the nose.

There is thus provided a brake holding mechanism 204 on the end of the tube 200 said mechanism serving to clamp the brake onto the tube after the yoke has completed its job of moving the brake away from the conveyor. The latch 252 insures a holding of the spring 250 cocked thereby retaining fingers 262 in their retracted position for withdrawal from the brake backing plate after the brake has been deposited in the container. It should be noted that the latch 240 may be held depressed by the backing plate at the moment when spring 250 is compressed and would therefore be rendered incapable of latching flange 248 to hold the spring compressed. The latch 240 prevents the release of spring 250 and subsequent extension of fingers 262 unless a brake is actually present even though an operation of the unloader disengages the latch 252. The latter condition would occur if the hook to be unloaded carried no brake. The operation of the latching mechanism will be more completely described hereinafter in giving the complete description of the operation of the entire mechanism.

Mechanism is provided making possible a return operation of the nose operating motor 202 and an operation of a double acting pressure differential operated motor 158' to return the tube 200 to its horizontal position, after and only after the part 220 is moved relative to the part 226 to effect a closing of the latches 240 and 252, 254 and a release of the brake; and this mechanism includes a bell crank lever stop member 257, Figure 7, pivotally mounted upon the lower end of a support 259 fixedly secured to the plate 218. The longer and horizontally extending arm of the lever 257 is in two parts, one on each side of the tube 200, said parts being connected by a strap 261 fitting around the tube. Describing the operation of the member 257 when the sleeve 226 of the brake supporting nose portion 204 is moved outwardly by the operation of the spring 250 and the nose portion 204 has been bodily moved a certain distance away from the pressure differential operated motor 202 by the operation of said motor, then a spring 267 operates to rotate said member 257 clockwise, Figure 7, thereby bringing an end portion 269 of said member opposite the end face of the tube. Then when the latch 252 is again closed, by moving the member 220 with respect to the temporarily stationary members 236, 232 and 226, the bell crank like stop member 257 is rotated counterclockwise to move the end portion 269 clear of the tube.

As will be brought out in the complete description of the mechanism of our invention there is thus provided, in the lever 257, means for preventing a complete return operation of the motor 202 and an operation of the motor 158' to return the tube to its horizontal position, until after the part 220 is moved relative to the part 226 to engage the latch 252.

The tube 200 is preferably rotated about a pivot structure 268 by means of the double acting air operated motor 158', Figures 8 and 18, said motor being controlled by a solenoid operated valve 167a which duplicates the valve 167 disclosed in Figure 15 and heretofore described; and the motor 158' is a duplicate of the previously described motor 158. As to the force transmitting means interconnecting the motor 158' and tube 220, a rod 270, Figure 18, connects the power element 162' of the motor with a rack 272; and this rack is meshed with a pinion 274 which is pivotally mounted on a shaft 276 extending from a standard 278. To a crank pin 280 mounted on the pinion there is pivotally connected a rod 282 which is pivotally connected at one of its ends to a lever like crank 284. This crank is fixedly connected at 286 and at 288 to the tube 200. Tube 200 is pivotally mounted to support member 292 at 288 and 290.

Describing the operation of the mechanism of Figure 18 energization of the motor 158' in one direction will effect a ninety degree rotation of the tube 200 about its pivot 268 in one direction; and energization of the motor in the other direction will effect a rotation of the tube in the other direction.

Describing now the electrical controls of the above described unloader mechanism, that is unloader unit A, Figure 1, said controls are disclosed in Figures 6, 8a, 8 and 7. The aforementioned signal switch 122 is electrically connected with the hot wire 291 of the secondary 292 of a transformer 294. The primary of said transformer is indicated by the reference numeral 296. As is disclosed in Figure 6 the hot wire 291 is electrically connected with the normally open section 298 of a single pole double throw switch 300, the normally open switch 122, a normally closed safety switch 302 closed by the operation of the tube 200 in moving to its horizontal position, and the aforementioned valve operating solenoid 196 which is connected with the ground of the secondary 292; and these switches are connected in series. The switch 300, in addition to the normally open section 298 thereof includes a normally closed section 299. The switch 300 is said to be depressed when the switch section 298 is closed and the switch section 299 is open; and the switch 300 is said to be released when the switch section 298 is open and the switch section 299 is closed. A spring, not shown, biases the switch 300 to its released position. The switch 302 is biased to its open position by the operation of a spring 201 however when the tube 200 is in its horizontal position a lever 304 is actuated by the tube to overcome the spring 201 thereby effecting a closing operation of the normally closed switch 302.

As disclosed in Figure 7 the switches 300 and 302 are suitably mounted on the framework of the mechanism of our invention. The normally open section 298 of switch 300 is closed by the mechanism disclosed in Figure 7 which includes a bell crank lever 306 pivotally mounted upon a pin 308 mounted in a support member 310. As is disclosed in Figures 2 and 5 the lower end of lever 306 includes two prongs which straddle the lever 252. A spring 312, interposed between one end of the lever 306 and a lever 314 pivotally mounted on the pin 308, cooperates with a spring 316, interposed between the lever 306 and a fixed support 318 secured to the lower end of the support 310, in controlling the operation of the switch 300. The springs 312 and 316 are preferably of equal rate the springs and associated parts being so positioned and constructed that when the tube with its nose 204 is in its vertical position the switch section 298 is closed.

Describing the operation of the switches 302 and 300, as the tube 200 is about to reach its horizontal position in the process of being rotated from its vertical position, it strikes the lever 304 to close the switch 302 and also strikes the lever 314 to compress the springs 312 and 316 without disturbing the switch 300 which is at that time depressed; furthermore in the last increment of movement of the tube in reaching its horizontal position an upper edge portion of the nose member 204 strikes an end portion A of the lever 306; and this results in an operation of the levers 314 and 306 to further compress the spring 312 without disturbing the switch 300. Thereafter, when the latch 252 is released and the brake 26 falls on the latch 240 to release the same, the spring 250 expands to move the member 226 away from the lever end portion A; and this results in an immediate expansion of the then substantially compressed spring 312 thereby rotating the lever 306 in a clockwise direction, Figure 7. This results in an operation of the switch 300 to complete an electrical circuit including a grounded solenoid 322, Figures 6 and 8, which operates the valve 167a to initiate an operation of the motor 158' to rotate the tube to its vertical position. It is to be mentioned here that in this operation after the tube leaves the switch operating lever 304 the spring 316 expands to depress the switch 300 the levers 306 and 314 and spring 312 moving counterclockwise as a unit.

Continuing the description of the electrical controls of our invention and referring to Figure 8 of the drawings the pressure differential operated motor 200 is controlled by a valve 167b which duplicates the valves 167 and 167a. The valve 167b is actuated by grounded solenoids 324 and 326 which are controlled by a hold down relay switch mechanism 328 and a normally open switch 330 which is closed by the tube 200 when and only when said tube is in its vertical position. Describing the relay switch 328 and its operating means the relay, indicated as a whole by the reference numeral 332 and outlined in dotted lines in Figure 8, includes a coil 334 and an armature 336 the latter being connected, by a rod 338, with a normally open hold down switch 340. The switch 340 constitutes the controlling switch of the relay. The rod 338 is also connected to the switch mechanism 328 which includes a normally open switch 344 and a normally closed switch 346. The switch 328 constitutes the controlled switch of the relay.

The switch 344 is connected in series with the grounded solenoid 324, the switch 330, and a grounded secondary winding 348 of a transformer 350 the primary winding of which is indicated by the numeral 352. The secondary winding 348 is connected in series with a grounded solenoid 354 which in part controls the valve 167a, and a normally open switch 356 which is operated in the manner described hereinafter. The relay coil 334 is preferably connected, by a conductor 358, to conductor Y from the source of electrical power; and said coil is also connected, by a conductor 360, with a normally open switch 362 which is connected, by a conductor 364 to conductor X from the source of electrical power. As is disclosed in Figures 8 and 16 the normally open switch 362 is momentarily closed by a spring return lever member 366 which is rotated a relatively short distance by a pin 368 mounted on the body of the tube 200. As the tube 200 moves toward its vertical position in the operation of the mechanism described hereinafter, the pin 368 strikes the end of the lever 366, Figure 16, and rotates said lever sufficiently to momentarily close the switch 362. Continued movement of the tube toward its completely vertical position results in a sliding of the pin 368 off of the end portion of the lever 366 thereby permitting a spring 370 to rotate said lever away from the switch 362 and permit the latter to return to its normally open position. When the tube 200 reaches its completely vertical position the body of the same strikes the switch 330, Figures 8 and 16, and closes the same.

The complete operation of the mechanism of our invention will now be described; and this description will cover parts of the mechanism not heretofore described. It is to be remembered that this description covers the operation of the above described loader A of Figure 1; and the concurrent operation of the above described unloader A; however this description will suffice for all of the loaders and unloaders of the mechanism inasmuch as all of the loaders are alike and all of the unloaders are alike. It is also to be remembered that both the loaders and unloaders operate in the same sequence in the embodiment of our invention being described.

Referring to Figures 11 and 12 of the drawings it will be assumed that the conveyor is in operation, that is the chain 18 and parts connected thereto, are being moved around the track 10 in the direction of the arrow in Figure 12. A hook, indicated as hook 16a for this description, is now approaching the loader A and this hook, immediately before it reaches the star wheel 96, enters a guide member 374 which is secured to the track 10. It will also be assumed that the hook 16a is mounted on the previously referred to hanger X, Figure 14, accordingly when this hanger contacts the finger Y the star wheel 96 is rotated to load a Ford front brake onto the outer prong of the hook 16a. In this operation the tray 30, as previously described, is angularly rotated toward the hook the brake being dumped onto the prong as it moves by the loader. The degree of this angular movement is limited by the operation of a stop 376, Figure 12, mounted on a projection 378 secured to the shaft 50. This stop contacts a stop 380, Figure 11, secured to the frame member 36. As previously described if the hook approaching the loader is already loaded with a brake then the clutch mechanism 42, 56 and cooperating parts is operative to temporarily render the loader mechanism inoperative.

The hook 16a having been loaded with a Ford front brake continues its movement around the conveyor until it reaches the Ford front brake unloader A; then when the hanger X supporting said hook contacts the crank 118, Figure 13, the unloading operation is initiated. Describing this operation immediately after the hanger X has left the crank 118 said crank is rotated by the spring 120 to effect a momentary closing of the signal switch 122; and this operation, through the intermediary of the then closed section 298 of switch 300, the then closed switch 302 and the grounded solenoid 196, Figure 6, results in an operation of the valve 167, Figure 15. As to the fact that the switch section 298 and switch 302 are at the time closed it is to be remembered that the tube 200 is at the time in its horizontal position. The safety switch 302 provides a means preventing an operation of the yoke motor 158 when the tube 200 is in any position other than its horizontal position. The operation of the valve 167 results in an energization of the motor 158 to rotate the yoke 130 downwardly from the position of the yoke disclosed in Figure 2 the piston 162 of said motor being connected to the yoke operating linkage by a rod 382, Figure 15. The hook 150 then snaps over the brake as is disclosed in Figure 3 and at this time the piston 162 of the motor has reached its lowermost position. Now in this position of the piston a cam 384, Figure 3, mounted on a rod 386 paralleling the motor 158, serves to close a normally open switch 388. This switch 388, Figure 6, is preferably fixedly secured to the framework of the mechanism and the rod 386 is secured at its end to a support 390 mounted on the rod 382. The piston 162, rod 382, support 390 and rod 386 move as a unit.

As is disclosed in Figure 6 when the switch 388 is closed the solenoid 194 is energized to operate the valve 167; and this results in a reversal of operation of the motor 158 to immediately return the yoke 130 with its brake unit to its upper position disclosed in Figures 2, 4, and 5. As described above just before the yoke reaches its uppermost position the latch 252, Figure 7, is unlocked; and very shortly thereafter when the hook strikes the roller 154 the brake unit is dropped upon the latch 240 to unlock the same. This latch unlocking operation permits the outward movement of the nose members 226 and 232 and this results in a locking of the brake upon the end of the nose 204 and an operation of the lever 306 and springs 312 and 316 to release the switch 300. This release operation, that is the closure of section 299 of switch 300, results in an operation of the valve 167a; and this results in an operation of the motor 158', Figure 8, to move the tube downwardly toward its vertical position to unload the brake. Just before the tube reaches its vertical position the pin 368 strikes the crank 366 to momentarily close the switch 362; and the resulting operation of the relay 332 results in a closure of the switches 344 and 340. As disclosed in Figures 8 and 8a the then energized coil 334 of the relay remains energized by virtue of a so-called hold down circuit including the secondary winding of the aforementioned transformer, not shown, a normally closed switch 400, and the switch 340. The switch 400 and its operation is described hereinafter. Now the switch 344 lies in one of the two electrical circuits including the switch 330 and when the latter is closed, by the body of the tube upon reaching its vertical position, then the solenoid 324 is energized. The energization of the latter solenoid results in an operation of the valve 167b to operate the motor 202 to move the piston 206 and parts connected thereto downwardly, Figure 8. It is to be remembered here that immediately after the tube 200 starts is downward movement the switch section 298 of the switch 300 is closed thereby, in part, preparing the valve controlling electrical circuit for again operating the yoke 130.

Continuing the description of the operation of the tube motor 202 the first increment of downward movement of the piston 206, Figure 8, results in the operation of a spring 392 to rotate a bell crank lever 393 counterclockwise; and this operation results in the operation of a bell crank lever 394 clockwise to the dotted line position A. The lever 393 is pivotally mounted on the casing 208 of the tube 200; and the lever 394 is pivotally mounted on a part of the framework of the mechanism. Continued downward movement of the piston 206 results in an operation of the spring 392 to rotate the lever 393 past the lever 394 thereby permitting the latter to drop, by gravity, back to a position B it being held in this position by the spring, not shown, of the normally open switch 356.

Now during this nose down operation of the motor 202 the nose 204 with the brake 26 mounted thereon is being moved downwardly into a brake container, not shown, the nose and brake being rotated, as they move downwardly, by virtue of the operation of the rollers 216 and the cooperating helically shaped connecting rod 212. This rotating operation serves to properly position the brake in the container. When the brake strikes the bottom of the container or a previously deposited brake in said container, movement of the nose member 226, Figure 9, and members connected thereto is stopped however the nose member 220 continues its movement downwardly through the center hole of the brake by virtue of the operation of the piston 206. With this operation the spring 250 is compressed until the member 220 is stopped by the pin 224. At this time movement of the piston 206 is stopped and the latch 252, 254 is again locked. Then when the fluid pressure in a chamber 396 of the motor 202 reaches a certain factor a pressure differential and spring operated switch operating member 398 is moved upwardly, Figure 8, to open the normally closed switch 400 in the hold-down circuit of the relay 332. Opening of the switch 400 results in a deenergization of the relay thereby permitting an armature spring 402 of the relay to expand to open the switch 340, open the switch 344 to deenergize the solenoid 324, and close the switch 346. The closing of the latter switch results in an energization of the solenoid 326 and this results in an operation of the valve 167b to effect an energization of the motor 202 to move the piston 206 upwardly.

Near the end of the upward movement of the piston 206 there is clockwise operation of the lever 393 to rotate the lever 394 counterclockwise; and this operation results in a closing of the normally open switch 356 to energize the grounded solenoid 354. In Figure 8 the lever 394 is shown in full lines in its position to close the switch 356. The operation of the solenoid 354 results in an operation of the valve 167a to effect an energization of the motor 158'; and this operation results in a rotation of the tube 200 back toward its horizontal position. In this operation the first increment of upward movement of the tube results in an opening of the switch 330 to deenergize the solenoid 326 and also results in the lever 393 bodily moving away from the lever 394 thereby permitting an operation of the spring, not shown, within the normally open switch 356 to both open the switch and rotate the lever 394 clockwise to its position B. The tube 200 continues its upward movement until it reaches its horizontal position the switch 302 being closed and the lever 314 being rotated clockwise during the last increment of said movement; and the spring 312 is compressed in the latter operation.

As to the unloader mechanism it is to be noted that the power means and electrical controls of our invention provide means to successively move a yoke downwardly to pick up a brake, move said yoke with its brake upwardly to deposit the brake on the end of a tube, that is the nose 204, move the tube with its brake from a horizontal that is starting position to a vertical position to deposit the brake in a container the tube nose operating motor within the tube coming into operation just as the tube approaches its vertical position, again operate the nose operating motor in the operation of preparing the mechanism for another brake unloading cycle of operations, and lastly returning the tube to its horizontal that is starting position.

There is thus provided an efficient and effective mechanism for transporting a plurality of different types of units, such as brakes, from one location to another said units being loaded by power operated means onto a conveyor in a certain sequence and unloaded by power means in sequence such that like units only are unloaded at a particular unloading station. The power operated loader units of our conveyor, loader, and unloader mechanism may be conveniently located in one area of say a manufacturing plant; and the power operated unloader units of our mechanism may be conveniently located in another area of said plant.

With our invention it is to be noted that when a certain number of loaders and unloaders are used, the total number of cooperating trolleys being a multiple of this number, that the sequence of operation of either the loaders or unloaders or both, may be varied at will. For example, with the loader mechanism of Figures 1 and 14 this is accomplished by changing of the relative positions of the starwheels 96 of the three loaders. Each of the rotatably mounted starwheels, Figure 14, of the loaders A, B, C, Figure 1, might be set up with respect to the remainder of the structure of Figure 14, that is rotated about the pin 80 to the desired position, so that the sequence of operation of said three loaders would be B, A, C instead of the A, B, C sequence previously described. There may, with the three loaders of Figure 1 be either one of two different sequences of operation of the loader mechanism; and with the three unloaders of Figure 1 either one of two different sequences may be selected; and either of said two loader sequences may be combined with one or the other of said two unloader sequences. The desired unloader sequence is, of course, effected by varying the relative positions of the pins 126 of the three rotatably mounted ratchets 112; and this is done by angularly rotating the ratchets 112, thereby changing the relative time of operation of the pins 126; and it may be noted here, as a feature of our invention, that the sequence of operation of the loaders and unloaders is only temporarily disturbed by the operation of the safety switch 302, Figure 6, of the safety mechanism of Figure 17.

It is also to be noted, from a reading of the objects of our invention, that one of the most important features of our invention lies in the means for providing an automatic loading in a desired sequence and an automatic unloading in a desired sequence, of a plurality of different products. The particular structures of the loader and unloader of this disclosure are disclosed and claimed, respectively, in our copending application Serial No. 600,476, filed July 27, 1956 and an application Serial No. 601,043, filed July 30, 1956; they constitute, per se, no part of the invention of this disclosure which is directed to the aforementioned means to effect the desired sequential loading and unloading operations and the consequent desired positioning of the brakes on the conveyor. For example, as embraced by some of the appended claims, the hanger portion of the trolleys of Figure 1 would, with their passage by the loaders and unloaders, operate to activate a suitable signalling control means of any well known type; and this signalling means, as with the switch 122 of the counter of Figure 13 of this application, would constitute a part of the counter mechanism of the power operated loader and unloader mechanisms. Any type of suitable loader and unloader used with our invention and not claimed herein will, of course, include adjustable counted means equivalent to the rotatably mounted starwheels 96 and their pins 100 of the loader and the rotatably mounted ratchets 112 and their pins 126 of the unloader; and this counter means, whatever it may be, is operative to determine the desired sequence of operation of the several loaders and unloaders and the relative position of the brakes on the conveyor; and it is to be remembered that the number of unloading operations in an unloading sequence may be increased or decreased by controlling the number of trolleys and varying the number of ratchet teeth and pins 126 on the ratchets 112; and the number of operations of a loader sequence may be varied by controlling the number of trolleys and varying the number of fingers 98 and pins 100 on the starwheels 96.

It is also to be noted, by a reading of the aforementioned objects of our invention, that since the heart of our invention lies in the automatically operative power operated means for sequentially loading and then sequentially unloading the workpieces, whatever they may be, it follows that the endless type of conveyor of the mechanism may be varied without departing from the spirit of the invention. For example, instead of using the disclosed monorail type of conveyor those practicing the invention may use an equivalent type of conveyor including the equivalent of the trolley mechanism disclosed herein. Such an equivalent conveyor mechanism, including the equivalent of applicants' trolleys, will operate, in combination with the adjustable counters of the loader and unloader units of our invention, to effect the desired sequential operation of said units.

We claim:

1. An automatically operable mechanism for sequentially loading a plurality of different units onto and then sequentially unloading said units from a power operated conveyor including a plurality of trolley units, a plurality of sequentially operable loader units mounted alongside the conveyor, each of the several loader units including an adjustable movable member actuated by a portion of each trolley unit and having means mounted thereon for varying the sequence of operation of the several loader units; and a plurality of unloader units also operable sequentially and mounted alongside the conveyor system, each of the several unloader units including a movable member actuated by a portion of each trolley unit and having means mounted thereon for varying the sequence of operation of the several unloader units.

2. A mechanism for sequentially loading a plurality of different units onto and then sequentially unloading said units from a powered conveyor system, said mechanism including an endless conveyor carrying a plurality of conveyor units, each unit comprising a trolley and hook member secured thereto, a plurality of successively operable loader units mounted along the conveyor system and a plurality of corresponding unloader units also operable successively and mounted along the conveyor system, said loader and unloader units including means actuated by the trolleys for energizing the same.

3. A loader, conveyor, unloader mechanism for conveying a certain number of different types of products from one place to another place said mechanism comprising a power operated conveyor mechanism including a number of conveyor units said number being a multiple of a certain number, a loader mechanism, consisting of the latter certain number of loader units, cooperable with the conveyor units; and a number of unloader units equaling in number the number of loader units and cooperable with the conveyor units and loader units in the operation of loading in a desired sequence, then conveying, then unloading in a desired sequence, the aforementioned products, each of said loaders and unloaders including an adjustable disk-like member actuated by a portion of each of the conveyors, said disk-like members having mounted thereon means, operative with an adjustment of the disks with respect to each other, for changing, at will, the sequence of operation of the loader mechanism and the sequence of operation of the unloader mechanism.

4. A loader, conveyor, unloader mechanism for transporting a certain number of different types of products from one place to another, said mechanism comprising a power operated conveyor mechanism including a number of conveyor units said number being a multiple of a certain number, each conveyor unit including a hanger and a hook, a loader mechanism comprising a plurality of loader units equaling in number the aforementioned certain number and cooperable with the hangers of the conveyor units as a source of power in loading onto the conveyor units, in sequence, the several types of products to be transported; and an unloader mechanism comprising a plurality of unloader units also equaling in number the aforementioned certain number and cooperable with the hangers of the conveyor units in unloading, in sequence, the aforementioned products, each unloader unit including power means as a source of power for operating the unit.

5. A loader, conveyor, unloader mechanism for transporting a certain number of different types of products from one place to another, said mechanism comprising a power operated conveyor mechanism including a number of conveyor units said number being a multiple of a certain number, a loader mechanism comprising a plurality of loader units cooperable with the conveyor units in loading onto the conveyor units, in a certain sequence, the several types of products to be transported; and an unloader mechanism comprising a plurality of power operated unloader units cooperable with the conveyor units in unloading, in the aforementioned certain sequence, the aforementioned products.

6. A loader, conveyor, unloader mechanism for conveying a certain number of different types of products from one place to another place said mechanism comprising a conveyor mechanism including a number of conveyor units said number being a multiple of a certain number, a loader mechanism comprising the latter certain number loader units said units being operated by the conveyor units and each loader unit being operative to load certain of the conveyor units with one of the several types of products to be conveyed, said loader units including means for effecting a sequential operation thereof, and a corresponding number of unloader units, including means for effecting a sequential operation thereof, cooperable with the conveyor units and loader units in the operation of loading, then conveying, then unloading, in a desired sequence, the aforementioned products; together with cut-out means for momentarily rendering the loader units inoperative in their operation of loading the conveyor units, said cut-out means being rendered operative when and only when the conveyor unit approaching the loader unit is already loaded with one of the aforementioned products.

7. A mechanism for loading a plurality of different types of products onto and unloading said products from a power driven conveyor system there being processed by the mechanism a plurality of units of each type of product, said mechanism including an endless conveyor carrying a certain number of conveyor units said number being a multiple of a certain number or a multiple of twice said number; a loader mechanism including a plurality of loader units driven by the power driven conveyor each of said units handling one of the aforementioned types of product, and an unloader mechanism including a plurality of unloader units each of the same handling one of the aforementioned types of products.

8. A mechanism for sequentially loading and then sequentially unloading work units from a power operated conveyor said system including an endless conveyor including a plurality of conveyor units, a plurality of loader units mechanically actuated by the conveyor units said loader units including means for effecting the desired sequential operation, a plurality of unloader units including means for effecting the desired sequential operation, power means, independent of the conveyor, for actuating the unloader units, and means for controlling the operation of said power means including switch means actuated by the conveyor units.

9. An automatically operated mechanism for sequentially loading a plurality of different types of products onto and sequentially unloading said products from a power operated conveyor, there being processed a plurality of units of each type of product, said mechanism including an endless conveyor comprising a number of conveyor units said number being a multiple of a certain number, a loader mechanism including a certain number, that is the latter number, of successively operable loader units adjustable to cooperate with and having control means activated by the conveyor units in the operation of sequentially loading the products to be processed onto the conveyor units, each of said loader units handling one of the aforementioned types of product; and an unloader mechanism including a certain number, that is the aforementioned certain number, of successively operable unloader units adjustable to cooperate with and having control means activated by the conveyor units, each of said unloader units handling one of the aforementioned types of products.

10. An automatically operative mechanism for sequentially loading a plurality of different units onto and then sequentially unloading said units from a powered conveyor, said mechanism including an endless conveyor comprising a plurality of conveyor units, a plurality of sequentially operable loader units mounted alongside the conveyor and a plurality of corresponding unloader units also operable sequentially and mounted alongside the conveyor, said loader and unloader units each including a sequence controlling adjustable counter mechanism activated by the conveyor units in the operation of energizing the loader and unloader units.

11. An automatically operable mechanism capable of sequentially loading a plurality of different workpiece units onto a power operated conveyor and then conveying the units in a certain order to an unloading mechanism operable to remove the units from the conveyor, said mechanism including, in combination with an unloading mechanism, a power operated conveyor comprising a plurality of workpiece handling units capable of being operative to carry the workpieces in a certain order, the number of said units being a multiple of a certain number, a loading mechanism comprising a number of loader units, said number being the aforementioned certain number or a multiple thereof, each of said loader units handling one of the different workpieces and including an adjustable counter mechanism operable, in cooperation with the preset adjustable counters of the remaining loader units and the particular number of workpiece handling units of the conveyor, to effect a loading of the several workpieces onto the several workpiece handling units in the desired sequence whereupon said workpiece units are conveyed to the unloading mechanism, said workpieces being positioned, as a corollary to the loading operation, in a certain order.

References Cited in the file of this patent

UNITED STATES PATENTS

| | | |
|---|---|---|
| 1,808,135 | Gotthardt et al. | June 2, 1931 |
| 1,832,000 | Caesar et al. | Nov. 17, 1931 |
| 1,900,603 | Gotthardt et al. | Mar. 7, 1933 |
| 2,017,390 | Barse | Oct. 15, 1935 |
| 2,237,160 | O'Malley | Apr. 1, 1941 |
| 2,348,112 | DaCosta | May 2, 1944 |
| 2,427,057 | Knox | Sept. 9, 1947 |
| 2,493,807 | Frederick | Jan. 10, 1950 |
| 2,661,828 | Vogt | Dec. 8, 1953 |
| 2,667,260 | Plyes | Jan. 26, 1954 |
| 2,708,501 | Boehm | May 17, 1955 |